United States Patent
Peng et al.

(10) Patent No.: US 7,495,905 B2
(45) Date of Patent: Feb. 24, 2009

(54) MOUNTING APPARATUS FOR STORAGE DEVICE

(75) Inventors: Wen-Tang Peng, Tu-Cheng (TW); Mo-Ming Yu, Shenzhen (CN); Shun-Hai Lin, Shenzhen (CN)

(73) Assignees: Hong Fu Jin Precision Industry (ShenZhen) Co., Ltd., Shenzhen, Guanddong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 11/309,420

(22) Filed: Aug. 4, 2006

(65) Prior Publication Data

US 2007/0115626 A1 May 24, 2007

(30) Foreign Application Priority Data

Nov. 18, 2005 (CN) .......................... 2005 2 0067930

(51) Int. Cl.
G06F 1/16 (2006.01)
A47B 81/00 (2006.01)

(52) U.S. Cl. .................................. 361/685; 312/223.1

(58) Field of Classification Search ......... 361/683–685, 361/724–727; 312/223.1, 223.2

See application file for complete search history.

(56) References Cited

U.S. PATENT DOCUMENTS

| 6,337,793 | B1* | 1/2002  | Vier et al. ................... 361/683 |
| 6,452,792 | B1* | 9/2002  | Chen ........................... 361/685 |
| 6,646,871 | B1* | 11/2003 | Liao et al. ................... 361/685 |
| 6,657,868 | B1* | 12/2003 | Hsue .......................... 361/728 |
| 6,751,093 | B1* | 6/2004  | Hsu et al. .................... 361/685 |

FOREIGN PATENT DOCUMENTS

| TW | 190919 | 9/1992 |
| TW | 211361 | 8/1993 |
| TW | 224797 | 6/1994 |
| TW | 458302 | 10/2001 |

* cited by examiner

*Primary Examiner*—Jayprakash N Gandhi
*Assistant Examiner*—Nidhi Desai
(74) *Attorney, Agent, or Firm*—Wei Te Chung

(57) ABSTRACT

An exemplary mounting apparatus for a storage device includes a chassis, a locking member, and a fastener. The storage device defines a pair of fixing holes in one sidewall thereof. The locking member is attached to the other sidewall thereof and includes a pair of slots defined therein. The chassis includes a side panel, and a bottom panel. The side panel includes a pair of pins extending therefrom and engaging in the fixing holes of the storage device. The bottom panel includes a pair of bridges extending therefrom and slidably engaging in the slots of the locking member. The fastener is attached to the locking member to secure the locking member to the bottom panel of the chassis.

20 Claims, 4 Drawing Sheets

MOUNTING APPARATUS FOR STORAGE DEVICE

FIELD OF THE INVENTION

The present invention relates to a mounting apparatus, and more particularly to a mounting apparatus for a storage device.

DESCRIPTION OF RELATED ART

Generally speaking, when a computer is assembled, a drive bracket is mounted in a computer enclosure, and then data storage devices are fixed to the drive bracket. The data storage devices include various combinations of hard disk drives (HDDs), floppy disk drives (FDDs), and compact disk-read only memory (CD-ROM) drives.

Conventionally, a data storage device is attached to a drive bracket of a computer by bolts. The data storage device may, for example, be a hard disk drive, a floppy disk drive, or a CD-ROM drive. However, attachment by bolts is complicated and time-consuming. Furthermore, attachment by such means requires extra work space be available inside the computer enclosure. This requirement runs counter to the trend toward miniaturization in the computer industry.

What is desired, therefore, is a mounting apparatus which readily allows securely installing or removing a storage device to or from a computer enclosure.

SUMMARY OF THE INVENTION

In one preferred embodiment, a mounting apparatus for a storage device includes a chassis, a locking member, and a fastener. The storage device defines a pair of fixing holes in one sidewall thereof. The locking member is attached to the other sidewall thereof and includes a pair of slots defined therein. The chassis includes a side panel, and a bottom panel. The side panel includes a pair of pins extending therefrom and engaging in the fixing holes of the storage device. The bottom panel includes a pair of bridges extending therefrom and slidably engaging in the slots of the locking member. The fastener is attached to the locking member and fixed to the bottom panel of the chassis.

Other advantages and novel features will become more apparent from the following detailed description of preferred embodiments when taken in conjunction with the accompanying drawings, in which:

DETAILED DESCRIPTION OF THE INVENTION

Figure 1:
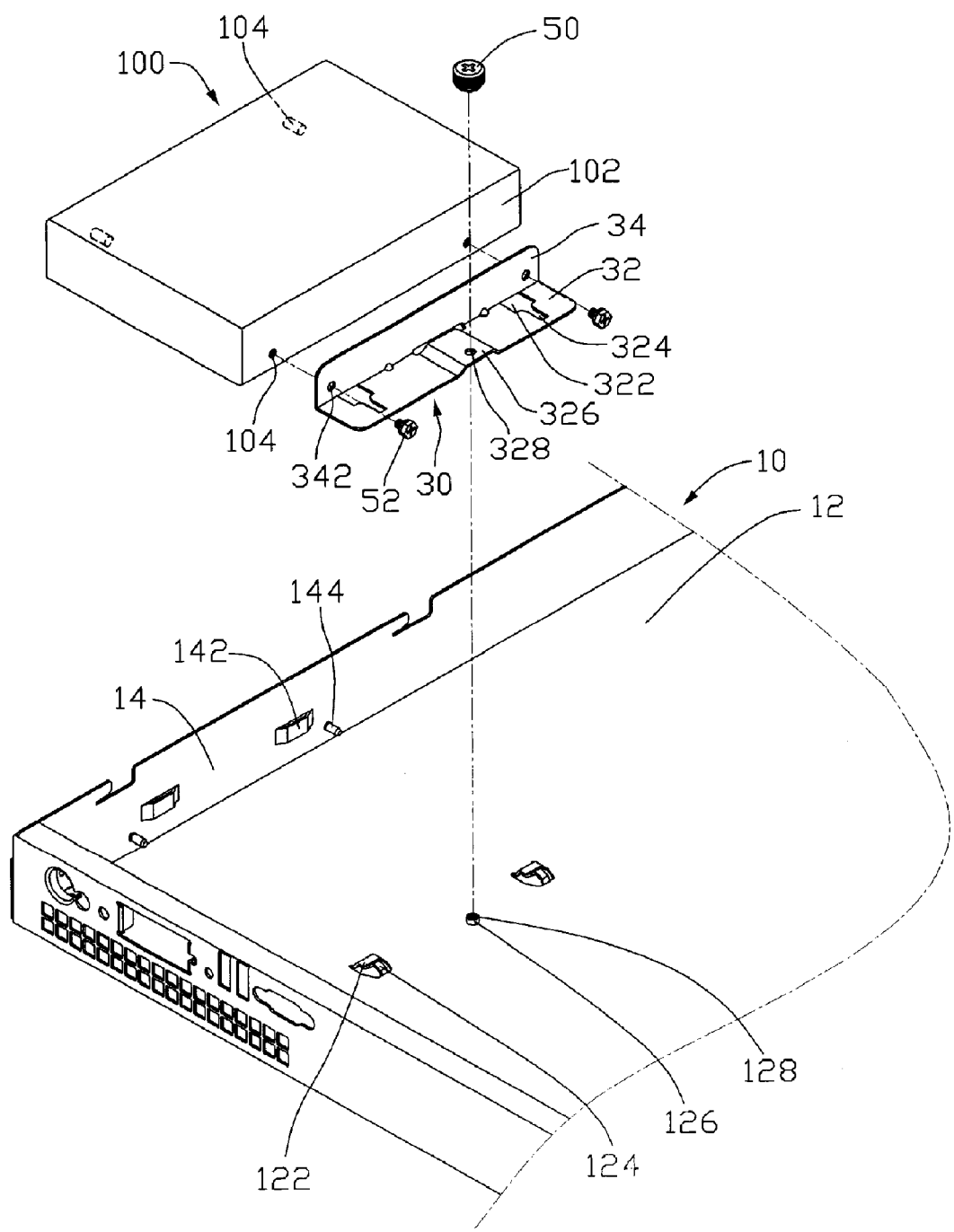
FIG. 1 is an exploded, isometric view of a mounting apparatus for a storage device in accordance with a preferred embodiment of the present invention, the mounting apparatus including a locking member.

Referring to FIG. 1, in a preferred embodiment of the invention, a mounting apparatus of an electronic device like a computer is provided for holding a functional device like a storage device 100 of the computer in place. The mounting apparatus includes a chassis 10, a locking member 30, and a fastener 50.

The storage device 100 includes a pair of opposite sidewalls 102. Two pairs of spaced fixing holes 104 are defined in each of the sidewalls 102 respectively.

The chassis 10 includes a bottom panel 12, and a side panel 14 perpendicularly extending from the bottom panel 12. A pair of resilient protruding members 142 is punched inwardly on the side panel 14. A pair of pins 144 extends in from the side panel 14 below the protruding members 142 respectively, corresponding to one pair of the fixing holes 104 of the storage device 100. A pair of spaced bridges 122 is punched upward in the bottom panel 12, corresponding to the protruding members 142 of the side panel 14. Each of the bridges 122 generally has a curved T-shape and includes a narrow first locking portion 124. Each of the bridges 122 is slanted and connected with the bottom panel 12 at two ends thereof. A post 126 defining a threaded hole 128 therein extends up from the bottom panel 12 between the bridges 122.

The locking member 30 generally has an L-shaped configuration and includes a first plate 32, and a second plate 34 perpendicular to the first plate 32. A pair of slots 322 is defined in the first plate 32, for slidably receiving the bridges 122 of the chassis 10 therein. Each of the slots 322 generally has a T-shape and includes a narrow second locking portion 324 in an outer end thereof. A protrusion 326 is punched upward from the first plate 32 between the slots 322, corresponding to the post 126 of the chassis 10. A through hole 328 is defined in the protrusion 326, for fixing the fastener 50. In the preferred embodiment, the fastener 50 is a captive screw and riveted on the first plate 32 in alignment with the through hole 328 of the protrusion 326. A pair of through holes 342 is defined in the second plate 34, corresponding to the other pair of the fixing holes 104 of the storage device 100.

Figure 2:
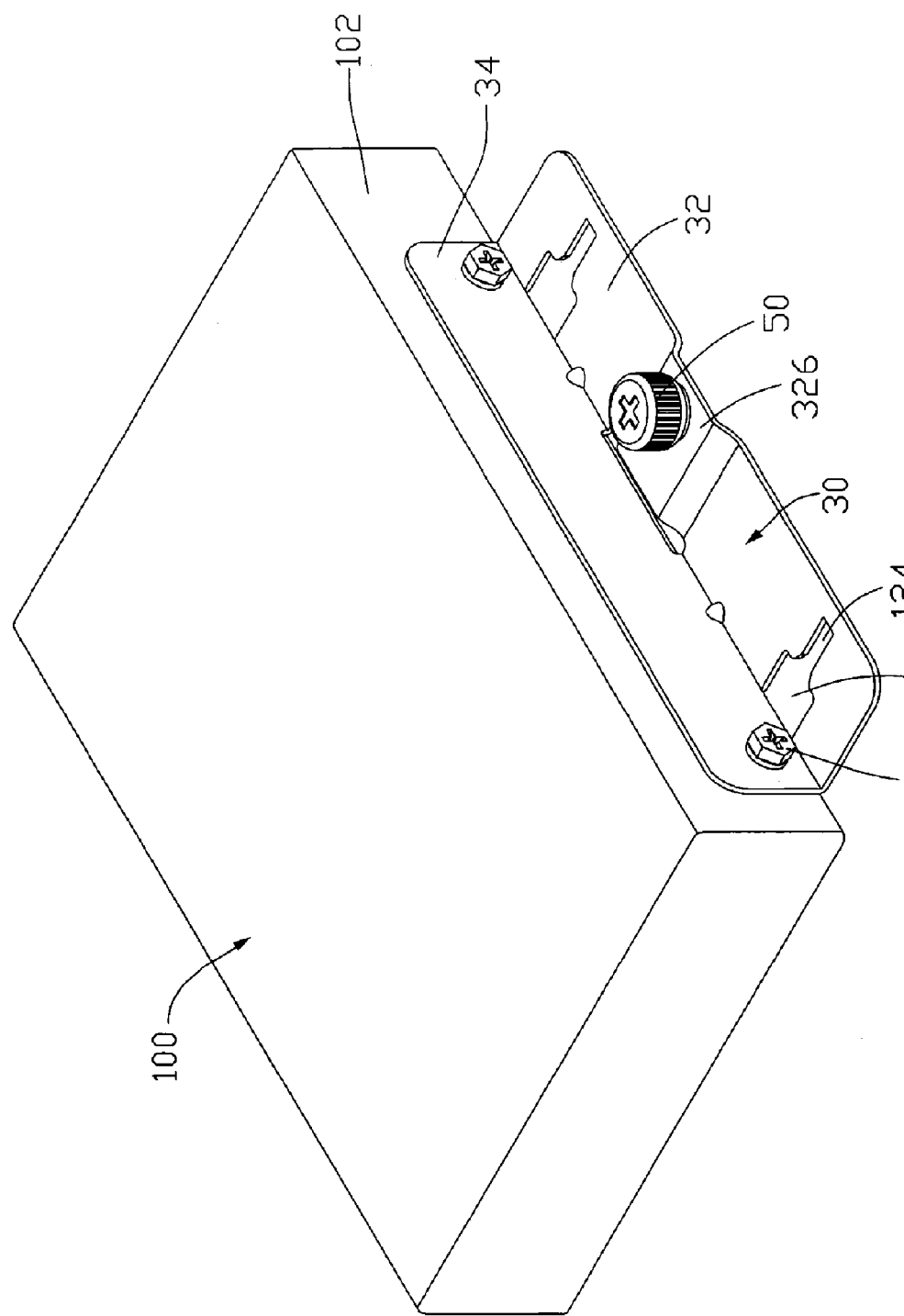
FIG. 2 is an enlarged, assembled view of the locking member and the storage device of FIG. 1.
Figure 3:
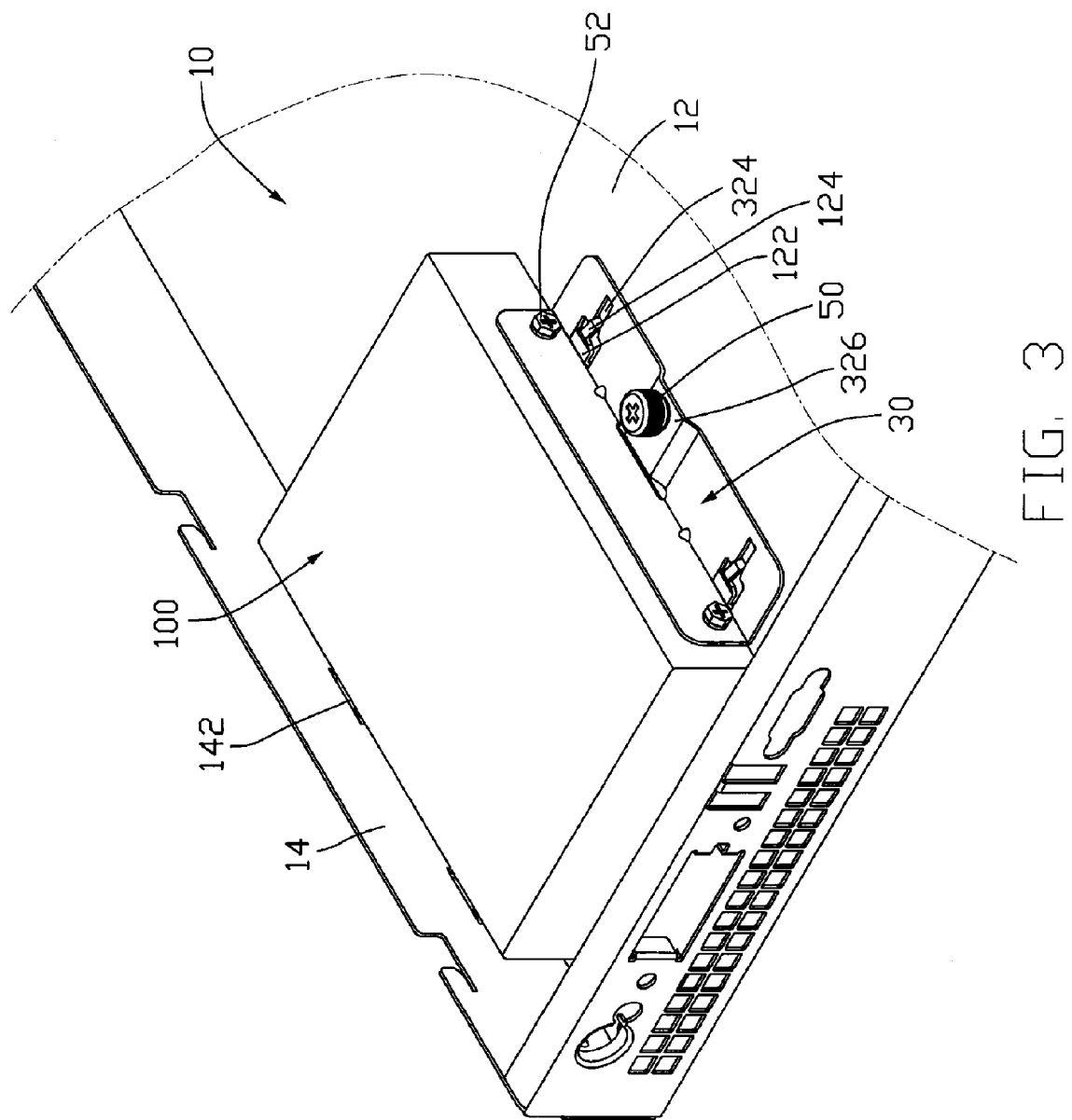
FIGS. 3 and 4 are assembled views of the mounting apparatus of FIG. 1, respectively showing a locked state and an unlocked state.
Figure 4:
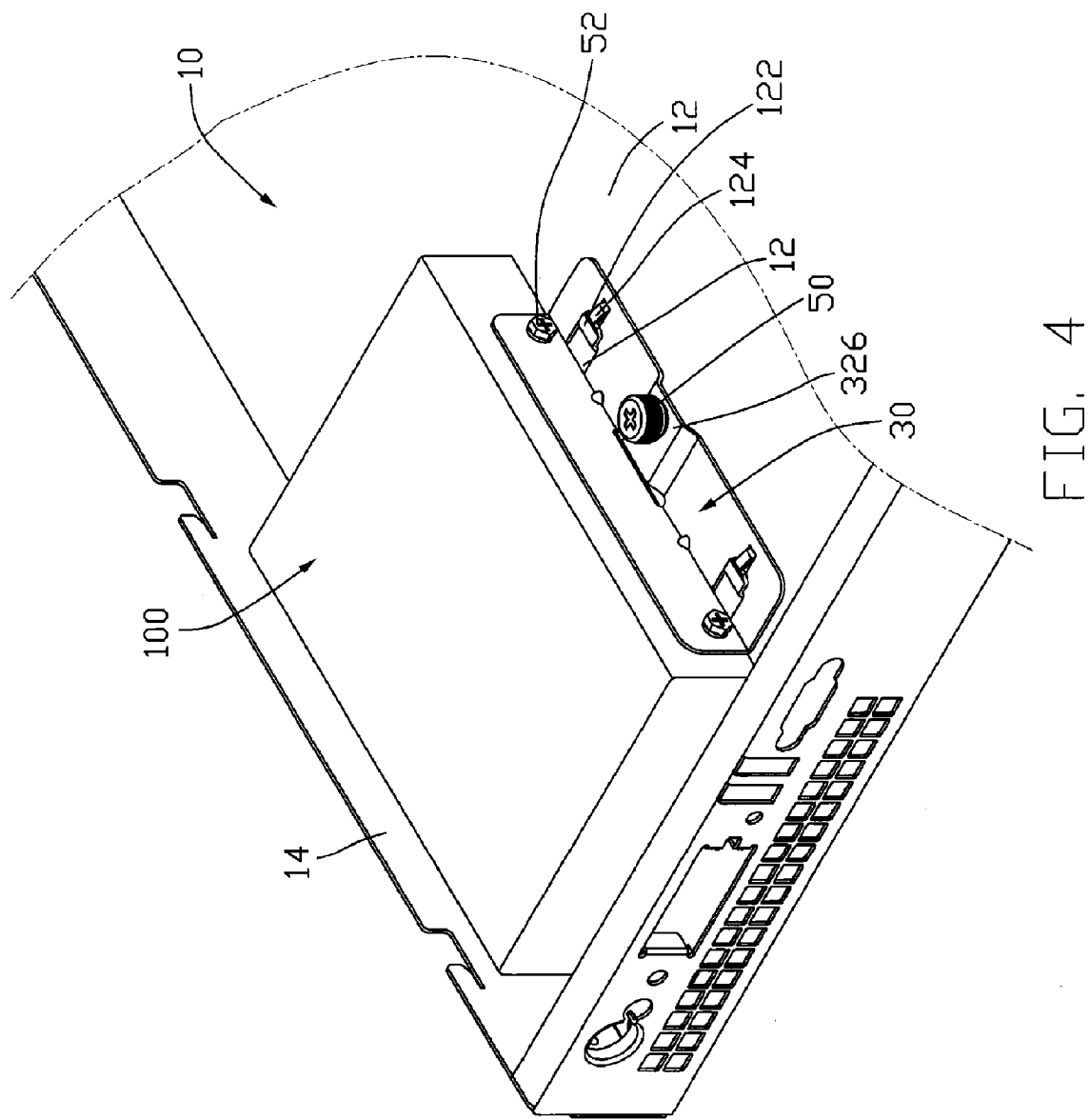

Referring to FIGS. 2 to 4, in assembly of the mounting apparatus, the locking member 30 is attached to one of the sidewalls 102 of the storage device 100, with a pair of screws 52 extending through the through holes 342 of the second plate 34 of the locking member 30 and engaging in the corresponding fixing holes 104 of the storage device 100. The fastener 50 is riveted on the protrusion 326, aligning with the through hole 328 thereof. The storage device 100 is placed in the chassis 10, with the bridges 16 of the chassis 10 extending through the slots 322 of the locking member 30 respectively and the pins 144 aligning with the corresponding fixing holes 104 of the storage device 100. The storage device 100 is slidably moved to the side panel 14 of the chassis 10, with the bridges 122 sliding in the slots 322. The pins 144 extend into the corresponding fixing holes 104 of the storage device 10. The first locking portions 124 of the bridges 122 engage in the second locking portions 324 of the slots 322. The fastener 50 aligns with and engages in the threaded hole 128 of the post 126 of the chassis 10. Thus, the storage device 100 is secured in the chassis 10.

To detach the storage device 100 from the chassis 10, the fastener 50 is unscrewed to disengage from the threaded hole 128 of the post 126 of the chassis 10. The storage device 100 is drawn away from the side panel 14 of the chassis, with the first locking portions 124 of the bridges 122 disengaging from the second locking portions 324 of the slots 322. The bridges 122 of the chassis 10 slide in the slots 322. The pins 144 of the side panel 14 of the chassis 10 slidably disengage from the corresponding fixing holes 104 of the storage device 100. The storage device 100 is then easily detached from the chassis 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for a storage device, the storage device comprising two opposite sidewalls, the mounting apparatus comprising:
   a locking member attached to one of the sidewalls, the locking member comprising at least one slot therein, said at least one slot comprising a wide end, and a narrow end communicating with the wide end;
   a chassis comprising a bottom panel, and a side panel, the side panel comprising at least one pin, the bottom panel comprising at least one bridge extending therefrom, said at least one bridge comprising a wide portion located near the side panel, and a narrow portion located away from the side panel, the narrow portion connecting with the wide portion; during said at least one pin slidably engaging in the other of the sidewalls in a direction perpendicular to the side panel, the narrow portion of said at least one bridge slides from the wide end to the narrow end of said at least one slot, the wide portion of said at least one bridge is blocked by the locking member at the narrow end of said at least one slot; and
   a fastener secured on the locking member and movably engaging with the bottom panel of the chassis.

2. The mounting apparatus as claimed in claim 1, wherein said at least one bridge is slanted and connected with the bottom panel of the chassis.

3. The mounting apparatus as claimed in claim 1, wherein the side panel of the chassis comprises at least one protruding member extending therefrom to abut the storage device.

4. The mounting apparatus as claimed in claim 1, wherein the locking member comprises a first plate, and a second plate perpendicular to the first plate, the first plate extends away from the other sidewall of the storage device.

5. The mounting apparatus as claimed in claim 4, wherein said at least one slot is defined in the first plate, the narrow end is located away from the second plate, and the wide end is located near the second plate.

6. The mounting apparatus as claimed in claim 4, wherein the first plate further comprises a protrusion extending therefrom and defining a through hole, the fastener is fixed to the first plate and aligns with the through hole.

7. The mounting apparatus as claimed in claim 6, wherein the bottom panel of the chassis further comprises a post defining a threaded hole therein for engaging with the fastener.

8. The mounting apparatus as claimed in claim 1, wherein the locking member comprises a first plate, and a second plate, the second plate is attached to the one sidewall of the storage device, and the first plate perpendicularly extends from the second plate and away from the storage device to be located beyond a projective area of the storage device on the bottom panel.

9. A mounting apparatus for a storage device, the storage device comprising two opposite sidewalls, the mounting apparatus comprising:
   a locking member attached to one sidewall of the storage device, the locking member comprising a pair of slots defined therein, each of slots comprising a narrow end, and a wide end communicating with the narrow end; and
   a chassis comprising a bottom panel, and a side panel, the side panel comprising a pair of pins extending inward therefrom, the bottom panel comprising a pair of bridges extending therefrom, each of the bridges comprising a wide portion located near the side panel, and a narrow portion located away from the side panel, the narrow portion connecting with the wide portion, during the pins slidably engaging in the other sidewall of the storage device in a direction perpendicular to the side panel, the narrow portion of said each bridge slides correspondingly from the wide end to the narrow end of said each slot, the wide portion of said each bridge is blocked by the locking member at the narrow end of said each slot.

10. The mounting apparatus as claimed in claim 9, further comprising a fastener, wherein the fastener is fixed to the locking member and movably engaging with the bottom panel of the chassis.

11. The mounting apparatus as claimed in claim 10, wherein the locking member further comprises a protrusion extending therefrom and defining a through hole, the fastener is a captive screw and fixed to the through hole.

12. The mounting apparatus as claimed in claim 11, wherein the bottom panel of the chassis further comprises a post defining a threaded hole therein for engaging with the fastener.

13. The mounting apparatus as claimed in claim 9, wherein the bridges are slanted and connected with the bottom panel of the chassis.

14. The mounting apparatus as claimed in claim 9, wherein the side panel of the chassis comprises a pair of protruding members extending therefrom to abut the storage device.

15. The mounting apparatus as claimed in claim 9, wherein the locking member comprises a first plate, and a second plate, the second plate is attached to the one sidewall of the storage device, and the first plate perpendicularly extends from the second plate and away from the storage device to be located beyond a projective area of the storage device on the bottom panel.

16. A mounting apparatus assembly comprising:
   a chassis comprising a bottom panel, and a side panel, the bottom panel comprising a bridge protruding the bottom panel;
   a storage device placed on the bottom panel of the chassis and moving along the bottom panel between a first position and a second position, the first position allowing the storage device freely to be removed from the bottom panel, the second position allowing the storage device to engage with the side panel to be retained against the bottom panel; and
   a locking member attached to and moving together with the storage device, the locking member engaging with the bottom panel of the chassis to retain the storage device in the second position, and comprising a slot defined therein, the slot comprising a narrow end located away from the storage device, and a wide end communicating with the narrow end and located near the storage device;
   wherein when the locking member together with the storage device slides on the bottom panel in a direction perpendicular to the side panel, the bridge slides from the wide end of the slot to the narrow end of the slot and is blocked by the locking member at the narrow end of the slot.

17. The mounting apparatus assembly as claimed in claim 16, wherein the looking member comprises a first plate, and a second plate perpendicular to the first plate and attached to one sidewall of the storage device, the first plate extends away from the other sidewall of the storage device.

18. The mounting apparatus assembly as claimed in claim 17, wherein the slot is define in the first plate of the locking member, the bridge comprises a wide portion located near the side panel, and a narrow portion located away from the side panel, the narrow portion connects with the wide portion.

19. The mounting apparatus assembly as claimed in claim 17, wherein the first plate further comprises a protrusion extending therefrom and defining a through hole, a fastener is fixed to the first plate, the bottom panel of the chassis further comprises a post defining a threaded hole therein for engaging with the fastener.

20. The mounting apparatus assembly as claimed in claim 16, wherein the side panel of the chassis comprises at least one protruding member extending therefrom to abut the storage device.

* * * * *